United States Patent
Kataoka et al.

(10) Patent No.: US 12,346,358 B2
(45) Date of Patent: Jul. 1, 2025

(54) NON-TRANSITORY COMPUTER-READABLE RECORDING MEDIUM STORING INFORMATION PROCESSING PROGRAM, INFORMATION PROCESSING METHOD, AND INFORMATION PROCESSING APPARATUS

(71) Applicant: FUJITSU LIMITED, Kawasaki (JP)

(72) Inventors: Masahiro Kataoka, Kamakura (JP); Yoshihide Tomiyama, Kobe (JP); Aya Iwata, Kobe (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 18/516,677

(22) Filed: Nov. 21, 2023

(65) Prior Publication Data

US 2024/0086439 A1 Mar. 14, 2024

Related U.S. Application Data

(63) Continuation of application No. PCT/JP2021/020512, filed on May 28, 2021.

(51) Int. Cl.
*G06F 16/334* (2025.01)
*G06F 40/242* (2020.01)

(52) U.S. Cl.
CPC ........ *G06F 16/3347* (2019.01); *G06F 40/242* (2020.01)

(58) Field of Classification Search
CPC ............................ G06F 16/3347; G06F 40/242
See application file for complete search history.

(56) References Cited

U.S. PATENT DOCUMENTS

2017/0017619 A1* 1/2017 Kataoka ............. H03M 7/6052
2017/0300507 A1 10/2017 Kataoka et al.
(Continued)

FOREIGN PATENT DOCUMENTS

JP 2003-141146 5/2003
JP 2017-518570 7/2017
(Continued)

OTHER PUBLICATIONS

International Search Report with English-language translation and Written Opinion with English-language translation of relevant part mailed on Aug. 10, 2021, in connection with PCT/JP2021/020512.
(Continued)

*Primary Examiner* — Tony Wu
(74) *Attorney, Agent, or Firm* — Fujitsu Intellectual Property Center

(57) ABSTRACT

A medium storing comprising instructions for: dividing a text into words; specifying an unknown word indicating a word other than a static word in a static dictionary among words in the text based on the static dictionary associating the static word with a vector; determining whether a unique word corresponding to the unknown word is included in a definition, using the definition defining a relationship between the unique word and a vector generated based on a condition that similar vectors are set for similar unique words; and when the unique word corresponding to the unknown word is included in the definition, assigning a vector corresponding to the unique word to the unknown word; and when the unique word corresponding to the unknown word is not included in the definition, assigning a vector to the unknown word using words arranged before and after the unknown word.

6 Claims, 10 Drawing Sheets

(56) References Cited

U.S. PATENT DOCUMENTS

| | | |
|---|---|---|
| 2018/0101553 A1 | 4/2018 | Nakamura et al. |
| 2019/0129948 A1 | 5/2019 | Nakajima et al. |
| 2019/0377746 A1* | 12/2019 | Kataoka ............... G06F 40/216 |
| 2022/0035848 A1 | 2/2022 | Kataoka et al. |

FOREIGN PATENT DOCUMENTS

| | | | |
|---|---|---|---|
| JP | 2017-194762 | 10/2017 | |
| JP | 2018-060463 | 4/2018 | |
| JP | 2019-082860 | 5/2019 | |
| JP | 2021-005117 | 1/2021 | |
| WO | 2015/173647 | 11/2015 | |
| WO | WO-2020044509 A1 * | 3/2020 | ........... G06F 40/247 |
| WO | 2020/213158 A1 | 10/2020 | |

OTHER PUBLICATIONS

Khrulkov et al., "Hyperbolic Image Embeddings", Cornell University, arXiv:1904.02239v1 [cs.CV], [Internet: https://arxiv.org/pdf/1904.02239v1.pdf], 10 pages, Apr. 3, 2019.
EESR—Extended European Search Report of European Patent Application No. 21943115.2 dated May 28, 2024 [9 pages].
AUOA—Examination Report issued on Nov. 25, 2024 for Australian Patent Application No. 2021447276 [3 Pages]. ** All references cited in the Office Action were previously submitted in the previously filed IDS.

* cited by examiner

People wear masks to prevent getting a disease⋯
⋯According to the researcher, this XYZdisease can be caused by stress.⋯

FIG. 4

| WORD | STATIC CODE | VECTOR |
|---|---|---|
| According | SCO1 | va1 |
| ... | ... | ... |

| GROUP ID | PROPER NOUN | VECTOR |
|---|---|---|
| G1(DISEASE) | XYZdisease | vb1 |
| | XYXdisease | vb2 |
| | XXXdisease | vb3 |
| | ... | ... |
| G1(PRODUCTS OF COMPANY A) | ABCproduct | vc1 |
| | ABBproduct | vc2 |
| | ACCproduct | vc3 |
| | ... | ... |
| ... | ... | ... |

FIG. 6

| DYNAMIC CODE (E0000000h~ EFFFFFFFh) | UNKNOWN WORD (PROPER NOUN) | VECTOR |
|---|---|---|
| E0000000h | XYZdisease | vb1 |
| E0000001h | ABBproduct | vc2 |
| ... | ... | ... |

| DYNAMIC CODE (F0000000h~ FFFFFFFFh) | UNKNOWN WORD (NEW WORD / BUZZWORD) | VECTOR |
|---|---|---|
| F0000000h | ganngraphic | v1 |
| ... | ... | ... |

NON-TRANSITORY COMPUTER-READABLE RECORDING MEDIUM STORING INFORMATION PROCESSING PROGRAM, INFORMATION PROCESSING METHOD, AND INFORMATION PROCESSING APPARATUS

CROSS-REFERENCE TO RELATED APPLICATION

This application is a continuation application of International Application PCT/JP2021/020512 filed on May 28, 2021 and designated the U.S., the entire contents of which are incorporated herein by reference.

FIELD

The present disclosure relates to a non-transitory computer-readable recording medium storing an information processing program and the like.

BACKGROUND

A large amount of data is registered in a data base (DB), and there is a demand to appropriately retrieve data desired by a user from the DB.

An example of a known server that performs data search will be described. When a server performs a data search, the search may be performed at various granularities such as documents, terms, sentences, and the like. For convenience of description, a server that searches for a sentence similar to a search query will be described here.

The server calculates a vector of each sentence included in the DB by using a static dictionary or the like in which a vector of a word is defined, and generates an inverted index indicating a relationship between the vector of the sentence and a position of the sentence on the DB. For example, the server calculates a vector of a sentence by integrating vectors of words included in the sentence. When receiving the search query, the server calculates the vector of the search query in the same manner as the case of calculating the vector of the sentence, compares the vector of the search query with the inverted index, and specifies the position of the sentence similar to the search query.

Here, the static dictionary is a dictionary that defines a relationship between a predetermined word and a vector corresponding to the word. A known server assigns a vector to an unknown word indicating a word that is not set in a static dictionary by using a technique such as Continuous Bag-Of-Words (CBOW). CBOW is a technique for calculating a vector of a target word based on words appearing before and after the target word.

Examples of the related art include: [Patent Document 1] Japanese Laid-open Patent Publication No. 2017-194762; [Patent Document 2] Japanese Laid-open Patent Publication No. 2018-060463; [Patent Document 3] Japanese National Publication of International Patent Application No. 2017-518570; and [Patent Document 4] Japanese Laid-open Patent Publication No. 2021-005117.

SUMMARY

According to an aspect of the embodiments, there is provided a non-transitory computer-readable storage medium storing an information processing program for causing a computer to execute processing including: dividing text data into a plurality of words; specifying, among the plurality of words divided from the text data, an unknown word indicating a word that does not correspond to a static word in a static dictionary based on the static dictionary defining a relationship among the static word, a static code, and a first vector; determining whether a unique word corresponding to the unknown word is included in definition information on the basis of the definition information defining a relationship between the unique word and a second vector being a vector generated on the basis of a condition that similar vectors are set for similar unique words; in response to the determining that the unique word corresponding to the unknown word is included in the definition information, assigning a dynamic code and the second vector corresponding to the unique word to the unknown word, to register a relationship among the unknown word, the second vector, and the dynamic code in a dynamic dictionary; in response to the determining that the unique word corresponding to the unknown word is not included in the definition information, assigning the dynamic code and a third vector to the unknown word, to register a relationship among the unknown word, the third vector, and the dynamic code in the dynamic dictionary, the third vector being a vector generated based on words arranged before and after the unknown word; dividing the text data into a plurality of pieces of partial data, each of the plurality of pieces of partial data being data including two or more words of the plurality of words; calculating, for each piece of the plurality of pieces of partial data, a partial vector corresponding to the piece of the plurality of pieces of partial data by integrating vectors assigned to the two or more words included in the piece of the plurality of pieces of partial data, each of the vectors assigned to the two or more words being any one of the first vector, the second vector, or the third vector; compressing, for each piece of the plurality of pieces of partial data, the text data using the static code registered in the static dictionary and the dynamic code registered in the dynamic dictionary, to generate compressed text data; generating, for each piece of the plurality of pieces of partial data, an inverted index associating the partial vector and a position of the piece of the plurality of pieces of partial data in the compressed text data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of a data file;

FIG. 4 is a diagram illustrating an example of a data structure of a static dictionary;

FIG. 5 is a diagram illustrating an example of a data structure of definition information;

FIG. 6 is a diagram illustrating an example of a data structure of a dynamic dictionary;

DESCRIPTION OF EMBODIMENTS

However, in the related art described above, there is a problem that the accuracy of a vector set to data such as a document or a sentence is low.

For example, in the related art, it is possible to use a technique such as CBOW when a vector is assigned to an unknown word that does not exist in the static dictionary, but an appropriate vector may not be assigned to the unknown word.

An advantage of some aspects of the invention is to provide an information processing program, an information processing method, and an information processing apparatus capable of improving the accuracy of a vector set in data.

Hereinafter, an information processing method, and an information processing apparatus disclosed in the present application will be described in detail with reference to the drawings. However, the present invention is not limited to these embodiments.

Examples

Figure 1:
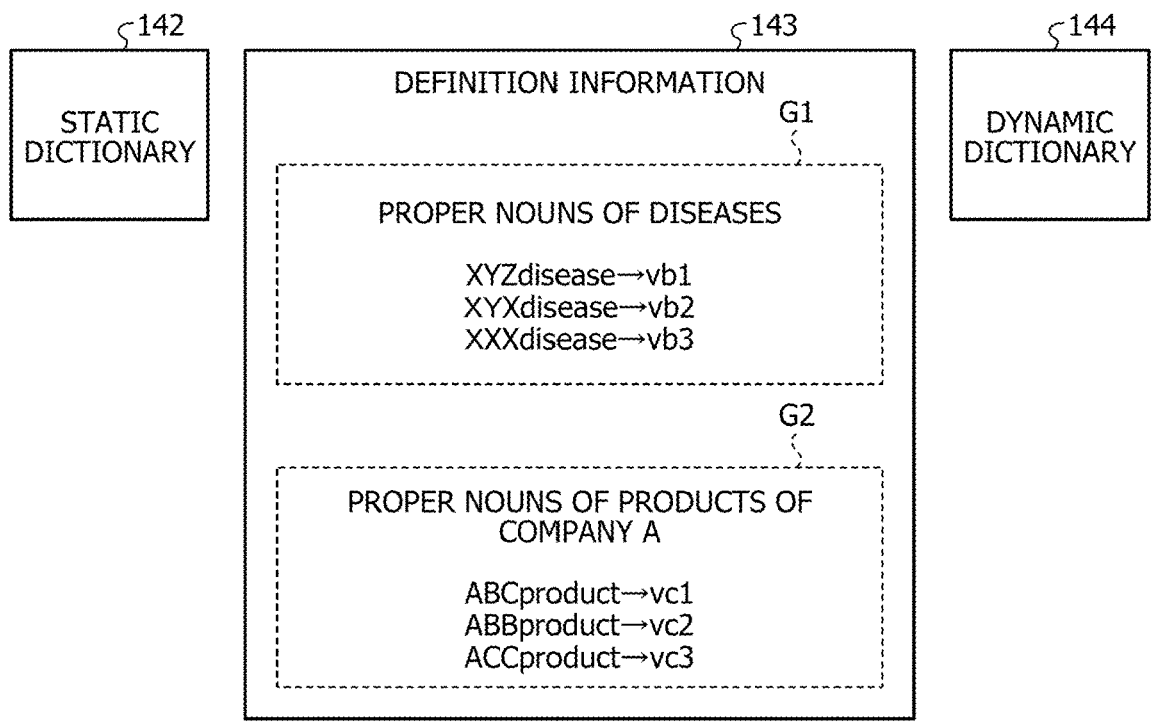
FIG. 1 is a diagram for explaining processing of an information processing apparatus according to the present embodiment.
Figure 1:
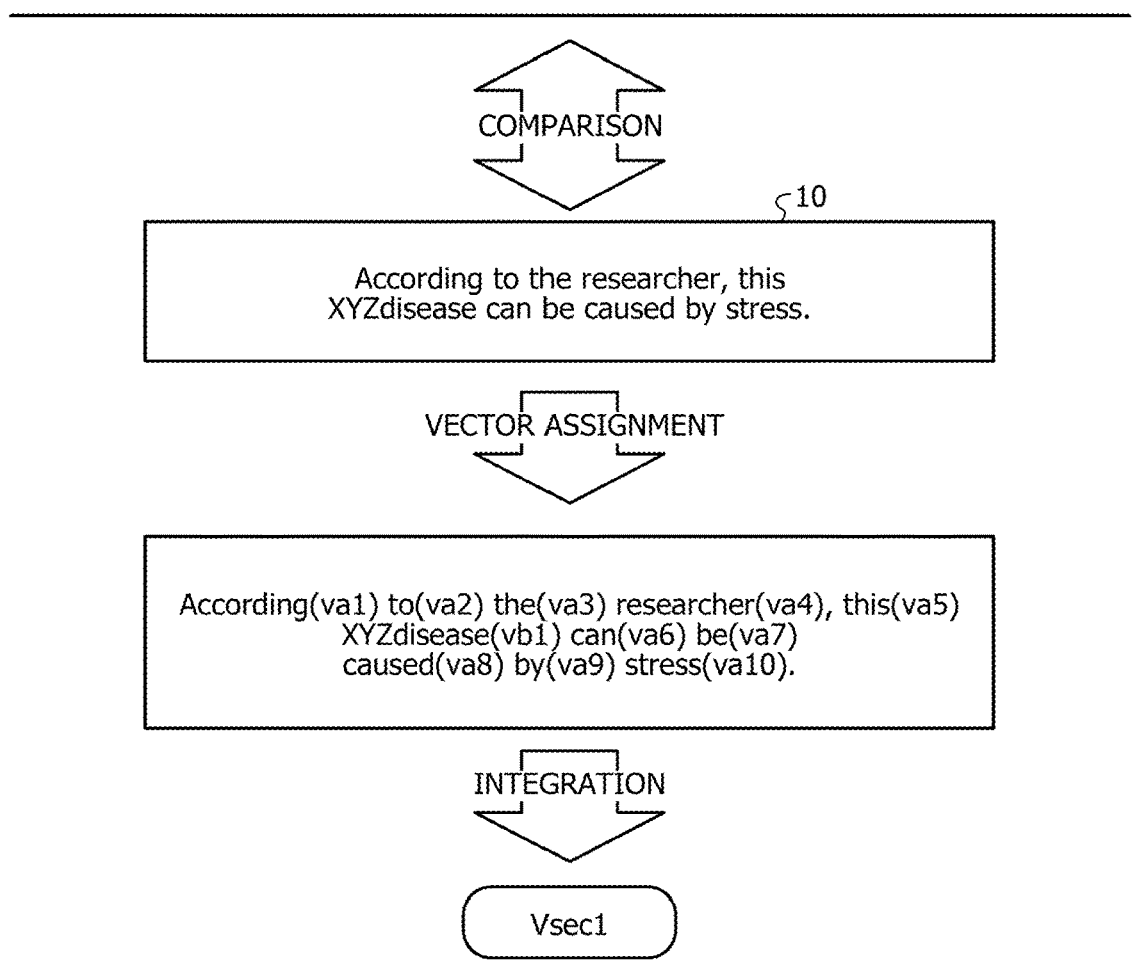

FIG. 1 is a diagram for explaining processing of the information processing apparatus according to the present embodiment. For example, the information processing apparatus uses a static dictionary 142, definition information 143, and a dynamic dictionary 144.

The static dictionary 142 is a dictionary that defines a relationship among a predetermined word, a static code, and a vector corresponding to the predetermined word. The predetermined word included in the static dictionary 142 is a word whose appearance frequency is equal to or higher than a predetermined frequency in predetermined text data such as various papers and novels in the Aozora-Bunko, and is selected in advance.

The definition information 143 includes a plurality of proper nouns, each of which is classified for each similar proper noun. The proper noun is a word selected by an expert or the like in each field without being limited to an appearance frequency or the like. In the example illustrated in FIG. 1, the definition information 143 includes a group G1 that is a set of proper nouns related to a disease and a group G2 that is a set of proper nouns of products of a company A. Although not illustrated in FIG. 1, it is assumed that the definition information 143 includes proper nouns belonging to other groups.

It is assumed that each proper noun included in the definition information 143 has been previously assigned a vector from a text including each proper noun, using a technique called Poincaré Embeddings. For the Poincaré embedding, it is possible to use a technique described, for example, in a non-patent literature "Valentin Khrulkov et al., Hyperbolic Image Embeddings, (Cornell University, 2019 Apr. 3)", and the like.

In Poincaré embedding, words (proper nouns) are embedded in a space called Poincaré space, and vectors corresponding to the embedded positions are assigned. In addition, there is a feature that the more similar the words are, the closer they are embedded at positions in the Poincare space. Therefore, since the proper nouns included in the same group are embedded at positions close to each other in the Poincare space, approximate vectors are assigned to the proper nouns.

For example, XYZdisease, XYZdisease, and XXXdisease, which are proper nouns of diseases belonging to the group G1, are assigned vectors vb1, vb2, and vb3, respectively, and each of the vectors vb1 to vb3 is an approximate vectors. ABCproduct, ABBproduct, and ACCproduct, which are proper nouns of the products of company A belonging to group G2, are assigned vectors vc1, vc2, and vc3, respectively, and each of the vectors vc1 to vc3 is an approximate vector.

The dynamic dictionary 144 is a dictionary that associates a dynamic code corresponding to an unknown word not registered in the static dictionary 142 with a vector of the unknown word, and each piece of information is registered by processing to be described later. A vector corresponding to an unknown word is also registered in the dynamic dictionary 144.

The information processing apparatus according to the present embodiment executes the following processing using the static dictionary 142, the definition information 143, and the dynamic dictionary 144 described above to calculate the vector of the sentence 10. For example, the sentence 10 is "According to the researcher, this XYZdisease can be caused by stress." The information processing apparatus divides the sentence 10 into a plurality of words by executing morphological analysis on the sentence 10. In the following description, description of commas, periods, and spaces is omitted.

The information processing apparatus compares a word included in the sentence 10 with the static dictionary 142, and assigns a vector defined in the static dictionary 142 to the word if the word is included in the static dictionary 142. For example, among the words included in the sentence 10, "According", "to", "the", "researcher", "this", "can", "be", "caused", "by", and "stress" are words defined in the static dictionary 142, and are assigned vectors va1 to va10, respectively.

The information processing apparatus compares a word included in the sentence 10 with the static dictionary 142, and specifies the word as an "unknown word" if the word is not included in the static dictionary 142. For example, if the word "XYZdisease" included in the sentence 10 is not registered in the static dictionary 142, "XYZdisease" is an unknown word. The information processing apparatus compares the unknown word with the definition information 143 and specifies whether or not a proper noun corresponding to the unknown word is included in the definition information 143.

When the proper noun corresponding to the unknown word is included in the definition information 143, the information processing apparatus assigns the vector defined in the definition information 143 to the unknown word. In the example illustrated in FIG. 1, since the proper noun corresponding to the unknown word "XYZdisease" is included in the definition information 143, the information processor assigns the vector vb1 of the proper noun "XYZdisease" to the unknown word.

On the other hand, when the proper noun corresponding to the unknown word is not included in the definition information 143, the information processing apparatus calculates the vector of the unknown word using a technique such as Continuous Bag-Of-Words (CBOW).

The information processing apparatus registers the unknown word in the dynamic dictionary 144, assigns a dynamic code to the unknown word, and registers the assigned dynamic code in the dynamic dictionary 144 in association with a vector assigned to the unknown word, whereby the dynamic dictionary 144 includes the unknown word, the dynamic code, and the vector in association with each other. The information processing apparatus assigns dynamic codes to unknown words in order based on a plurality of dynamic codes prepared in advance.

The information processor calculates the vector Vec1 of the sentence 10 by assigning a respective vector to each word and integrating each vector through the processing described above. The information processing apparatus compresses the words included in the sentence 10 into a static code and a dynamic code based on the static dictionary 142 and the dynamic dictionary 144. When the unknown word of the sentence 10 is already registered in the dynamic dictionary 144, the information processing apparatus uses a vector corresponding to the unknown word (proper noun) registered in the dynamic dictionary 144.

As described above, when assigning a vector to each word in the sentence 10, the information processing apparatus according to the present embodiment assigns a vector defined in the static dictionary 142 to a word registered in the static dictionary 142. The information processing apparatus assigns a vector defined in the definition information 143 to an unknown word included in the sentence 10 when the unknown word corresponds to a proper noun included in the definition information 143, and assigns a vector using the CBOW when the unknown word does not correspond to a proper noun included in the definition information 143.

For example, when a vector of an unknown word is calculated using CBOW, the value of the vector may vary depending on words appearing before and after the unknown word. On the other hand, for the proper nouns defined in the definition information 143, it is possible to stabilize the value of the vector by calculating the vector in advance through Poincare embedding. Thus, the accuracy of the sentence vector may be improved.

Figure 2:
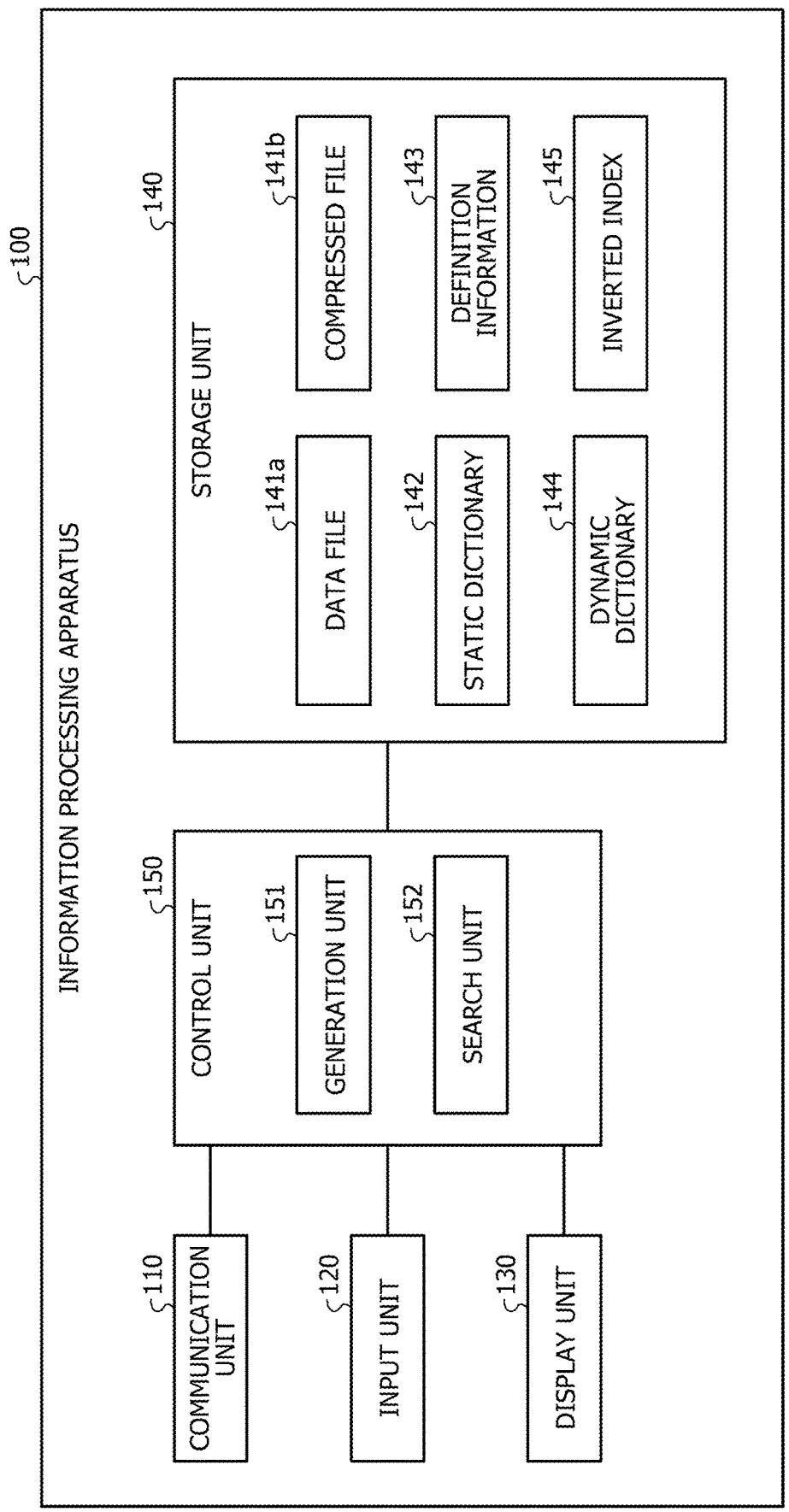
FIG. 2 is a functional block diagram illustrating a configuration of the information processing apparatus according to the present embodiment.

Next, an example of a configuration of the information processing apparatus according to the present embodiment will be described. FIG. 2 is a functional block diagram illustrating a configuration of the information processing apparatus according to the present embodiment. As illustrated in FIG. 2, the information processing apparatus 100 includes a communication unit 110, an input unit 120, a display unit 130, a storage unit 140, and a control unit 150.

The communication unit 110 is coupled to an external device or the like in a wired or wireless manner, and transmits and receives information to and from the external device or the like. For example, the communication unit 110 is realized by a network interface card (NIC) or the like. The communication unit 110 may be coupled to a network (not illustrated).

The input unit 120 is an input device that inputs various types of information to the information processing apparatus 100. The input unit 120 corresponds to a keyboard, a mouse, a touch panel, or the like. For example, the user may operate the input unit 120 to input a search query or the like.

The display unit 130 is a display device that displays information output from the control unit 150. The display unit 130 corresponds to a liquid crystal display, an organic electro luminescence (EL) display, a touch panel, or the like.

For example, a search result corresponding to the search query is displayed on the display unit 130.

The storage unit 140 includes a datafile 141a, a compressed file 141b, a static dictionary 142, definition information 143, a dynamic dictionary 144, and an inverted index 145. The storage unit 140 is realized by, for example, a semiconductor memory element such as a random access memory (RAM) or a flash memory, or a storage device such as a hard disk or an optical disk.

The data file 141a corresponds to text data. FIG. 3 is a diagram illustrating an example of a data file. Although text data in English is shown in FIG. 3, the present invention is not limited thereto, and text data in another language may be used, or a base sequence representing a genome or a chemical structural formula representing an organic compound may be used.

The compressed file 141b includes data obtained by compressing the data file 141a on a word basis based on the static dictionary 142 and the dynamic dictionary 144. Illustration of the compressed file 141b is omitted.

The static dictionary 142 is a dictionary that defines a relationship among a predetermined word, a static code, and a vector corresponding to the predetermined word. FIG. 4 is a diagram illustrating an example of a data structure of the static dictionary. As illustrated in FIG. 4, the static dictionary 142 associates a word, a static code, and a vector with each other.

In the definition information 143, vectors corresponding to a plurality of proper nouns are set. FIG. 5 is a diagram illustrating an example of a data structure of definition information. As illustrated in FIG. 5, the definition information 143 associates a group identification (ID), a proper noun, and a vector with each other.

The group ID is information for uniquely identifying a group to which a proper noun belongs. Proper nouns belonging to the same group are similar proper nouns. The proper nouns are words that have been set, without regard to an appearance frequency or the like, by an expert or the like in each field. The vector is a vector set to a proper noun. For example, it is assumed that the vector is assigned in advance using a technique called Poincare embedding.

The dynamic dictionary 144 is a dictionary that associates a dynamic code corresponding to an unknown word not registered in the static dictionary 142 with a vector of the unknown word. FIG. 6 is a diagram illustrating an example of a data structure of the dynamic dictionary. As illustrated in FIG. 6, the dynamic dictionary 144 includes a dictionary table 144a and a dictionary table 144b.

In the dictionary table 144a, a proper noun defined by the definition information 143 among unknown words, a dynamic code, and a vector are associated with each other. The range of dynamic codes assigned to proper nouns is set in advance, and is, for example, "E0000000h to EFFFFFFFh". "h" is a symbol indicating a hexadecimal number. The proper noun is a proper noun defined by the definition information 143. The vector is a vector defined by the definition information 143. It is noted that the dictionary table 144a may be configured such that the proper noun is stored in a storage area different from that of the dictionary table 144a, and then the position of the proper noun is indicated by a pointer.

In the dictionary table 144b, an unknown word that is not defined in the definition information 143, such as a new word or a buzzword, a dynamic code, and a vector are associated with each other. The range of the dynamic code assigned to the proper noun is set in advance and is, for example, "F0000000h to FFFFFFFFh". "h" is a symbol indicating a hexadecimal number. An unknown word such as a new word or a buzzword is an unknown word that is not defined in the definition information 143. The vector is a vector calculated by CBOW. It is noted that the dictionary table 144b may be configured such that an unknown word such as a new word or a buzzword is stored in a storage area different from that of the dictionary table 144b, and then the position of the unknown word is indicated by a pointer.

The inverted index 145 is information that defines the relationship between the vector of a sentence and the offset of the sign of the word at the beginning of the sentence. The code corresponds to a static code in the static dictionary 142 or a dynamic code in the dynamic dictionary 144. For example, the offset "0" corresponds to the position of the leading code of the compressed file 141b. The offset "N" corresponds to the position of the "N+1" th code from the head of the compressed file 141b.

Figure 7:
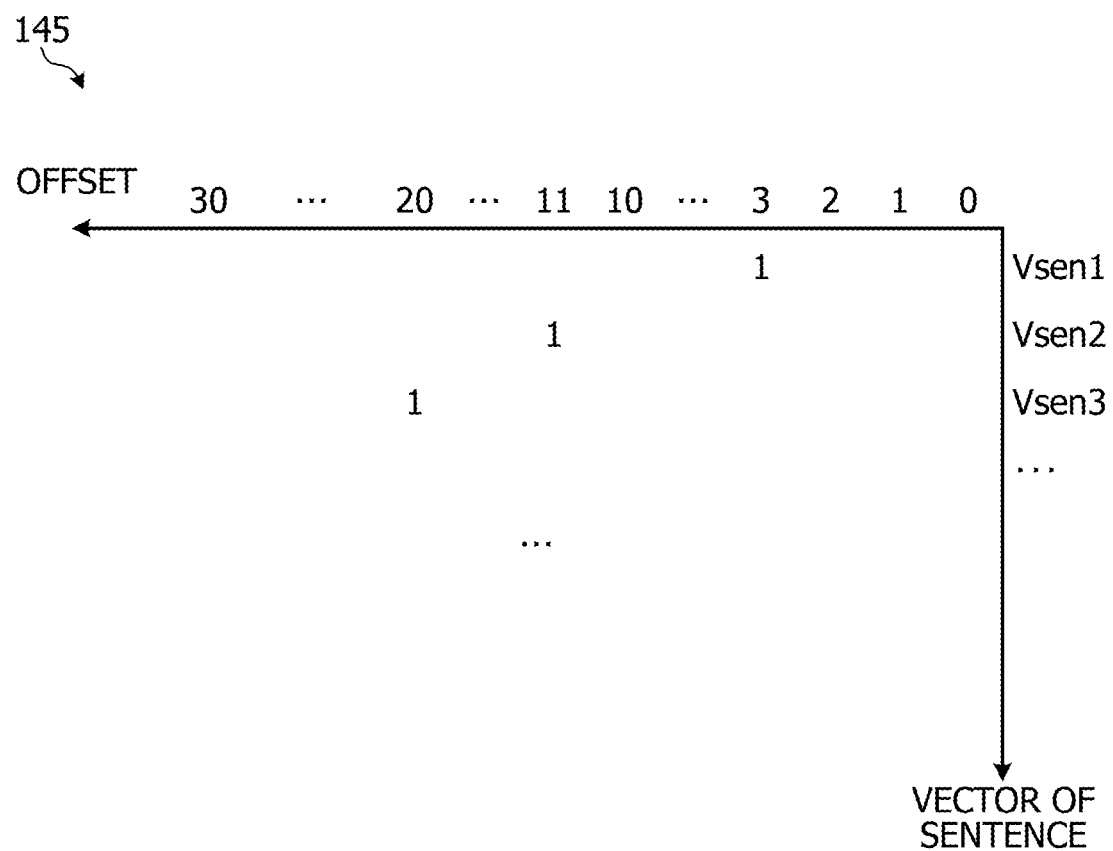
FIG. 7 is a diagram illustrating an example of a data structure of an inverted index.

FIG. 7 is a diagram illustrating an example of a data structure of an inverted index. In the inverted index 145 illustrated in FIG. 7, the horizontal axis indicates the offset of the compressed file 141b. The vertical axis corresponds to the vector of the sentence. For example, the flag "1" is set on a part that intersects the row of the sentence vector "Vsen1" and the column of the offset "3". Therefore, it is indicated that the sign of the word at the head of the sentence corresponding to the sentence vector "Vsen1" is located at the offset "3" of the compressed file 141b. It is assumed that all initial values of the inverted index 145 are set to 0.

Refer back to FIG. 2. The control unit 150 includes a generation unit 151 and a search unit 152. The control unit 150 is realized by, for example, a central processing unit (CPU) or a micro processing unit (MPU). Further, the control unit 150 may be implemented by an integrated circuit such as an application specific integrated circuit (ASIC) or a field programmable gate array (FPGA).

The generation unit 151 calculates a vector of a sentence included in data file 141a by executing the processing described in FIG. 1. In addition, the generation unit 151 compresses the data file 141a into the compressed file 141b using the static dictionary 142 and the dynamic dictionary 144 to generate the inverted index 145.

The generation unit 151 acquires one sentence from the data file 141a based on a period, a punctuation mark, or the like. The generation unit 151 executes the following processing on the acquired sentence. Here, the processing of the generation unit 151 will be described using the sentence 10 described in FIG. 1.

The generation unit 151 divides the sentence 10 into a plurality of words by executing morphological analysis on the sentence 10. The generation unit 151 compares a word included in the sentence 10 with the static dictionary 142, and assigns a vector defined in the static dictionary 142 to a word included in the static dictionary 142. In the example described with reference to FIG. 1, the vectors va1 to va10 are respectively assigned to "According", "to", "the", "researcher", "this", "can", "be", "caused", "by", and "stress".

The generation unit 151 compares a word included in the sentence 10 with the static dictionary 142 and specifies a word not included in the static dictionary 142 as an "unknown word". For example, if the word "XYZdisease" included in the sentence 10 is not registered in the static dictionary 142, "XYZdisease" is an unknown word. When the unknown word "XYZdisease" is registered in the dynamic dictionary 144, the generation unit 151 assigns the unknown word to a vector corresponding to the unknown word.

On the other hand, when the unknown word "XYZdisease" is not registered in the dynamic dictionary 144, the generation unit 151 compares the unknown word with the definition information 143 and specifies whether or not a proper noun corresponding to the unknown word is included in the definition information 143.

When the proper noun corresponding to the unknown word is included in the definition information 143, the generation unit 151 assigns the vector defined in the definition information 143 to the unknown word. In addition, the generation unit 151 assigns an unassigned dynamic code of "E0000000h to EFFFFFFFh" to the unknown word, and registers the dynamic code, the unknown word (proper noun), and the vector in the dynamic dictionary in association with each other.

On the other hand, when a proper noun corresponding to an unknown word such as a new word or a buzzword is not included in the definition information 143, the generation unit 151 calculates a vector of the unknown word using a technique such as CBOW. In addition, the generation unit 151 assigns an unassigned dynamic code among "F0000000h to FFFFFFFFh" to the unknown word, associates the dynamic code, the unknown word (new word, buzzword, or the like), and the vector (vector by CBOW) with each other, and registers them in the dynamic dictionary 144.

The generation unit 151 calculates the vector Vsen1 of the sentence 10 by assigning a vector to each word and unknown word of the sentence 10 and integrating the assigned vectors through the above-described processing. The generation unit 151 compresses the sentence 10 by converting the words of the sentence 10 into a static code and a dynamic code based on the static dictionary 142 and the dynamic dictionary 144, and registers the compressed sentence 10 in the compressed file 141b. The generation unit 151 sets the relationship between the offset of the code at the head of the compressed sentence 10 and the vector of the sentence 10 to the inverted index 145.

The generation unit 151 generates the compressed file 141a and the inverted index 145 by repeatedly executing the above-described processing for each sentence included in the file 141b. When registering a compressed sentence in the compressed file 141b, the generation unit 151 may arrange a code indicating a break between the last code of the previous compressed sentence and the first code of the current compressed sentence. When the last code of the compressed sentence is a unique code such as a period, the code indicating the break may not be arranged.

The description returns to FIG. 2. The search unit 152 is a processing unit that searches for a sentence similar to a search query when the search query is received. An example of processing performed by the search unit 152 will be described below. In the present embodiment, the search query is described as a sentence having a plurality of words.

The search unit 152 executes a process of calculating a vector of a search query and a process of searching for a sentence similar to the search query using the vector of the search query.

The processing will be described in which the search unit 152 calculates a vector of a search query. Upon receiving the search query, the search unit 152 divides the search query into a plurality of words by executing morphological analysis. The search unit 152 compares the divided words with the static dictionary 142. And, for the word included in the static dictionary 142, a vector defined in the static dictionary 142 is assigned. When there is an unknown word that is not included in the static dictionary 142 among the divided words, the search unit 152 compares the unknown word with the dynamic dictionary 144. And, for the unknown word included in the dynamic dictionary 144, a vector set in the dynamic dictionary 144 is assigned.

When the corresponding unknown word is not set in the dynamic dictionary 144, the search unit 152 assigns a vector corresponding to the unknown word by using the definition information 143 in the same manner as the generation unit 151.

For example, when a proper noun corresponding to an unknown word is included in the definition information 143, the search unit 152 assigns a vector defined in the definition information 143 to the unknown word. In addition, the search unit 152 assigns an unassigned dynamic code among "E0000000h to EFFFFFFFh" to the unknown word, and registers the dynamic code, the unknown word (proper noun), and the vector in the dynamic dictionary in association with each other.

When a proper noun corresponding to an unknown word such as a new word or a buzzword is not included in the definition information 143, the search unit 152 calculates a vector of the unknown word using a technique such as CBOW. In addition, the search unit 152 assigns an unassigned dynamic code among "F0000000h to FFFFFFFFh" to the unknown word, and registers the dynamic code, the unknown word (a new word, a buzzword, or the like), and the vector (a vector by CBOW) in the dynamic dictionary 144 in association with each other.

The search unit 152 calculates the vector of the search query by assigning a vector to each word and unknown word of the search query and integrating the assigned vectors through the above-described processing. In the following description, a vector of a search query may be referred to as a "search vector".

Next, the processing will be described in which the search unit 152 searches for a sentence similar to the search query. The search unit 152 specifies a vector of a sentence similar to the search vector based on the search vector and the vector of each sentence of the inverted index. For example, the search unit 152 calculates a cosine similarity between the search vector and the vector of the sentence, and specifies the vector of the sentence whose the cosine similarity is equal to or greater than a threshold value. In the following description, a vector of a sentence whose the cosine similarity with the search vector is equal to or greater than a threshold may be referred to as a "specific vector".

The search unit 152 scans the row of the specific vector among the vectors of the sentences in the inverted index 145 and specifies the offset of the sentence of the specific vector. In the following description, an offset of a sentence of a specific vector may be referred to as a "specific offset". The search unit 152 extracts a compressed sentence from the position of the compressed file 141b corresponding to the specific offset, and decodes the compressed sentence based on the static dictionary 142 and the dynamic dictionary 144. The search unit 152 outputs the decoded sentence to the display unit 130 and displays it. When the search query is received from the external device via the network, the information processing device 100 (the search unit 152) transmits the decoded sentence to the external device.

Figure 8:
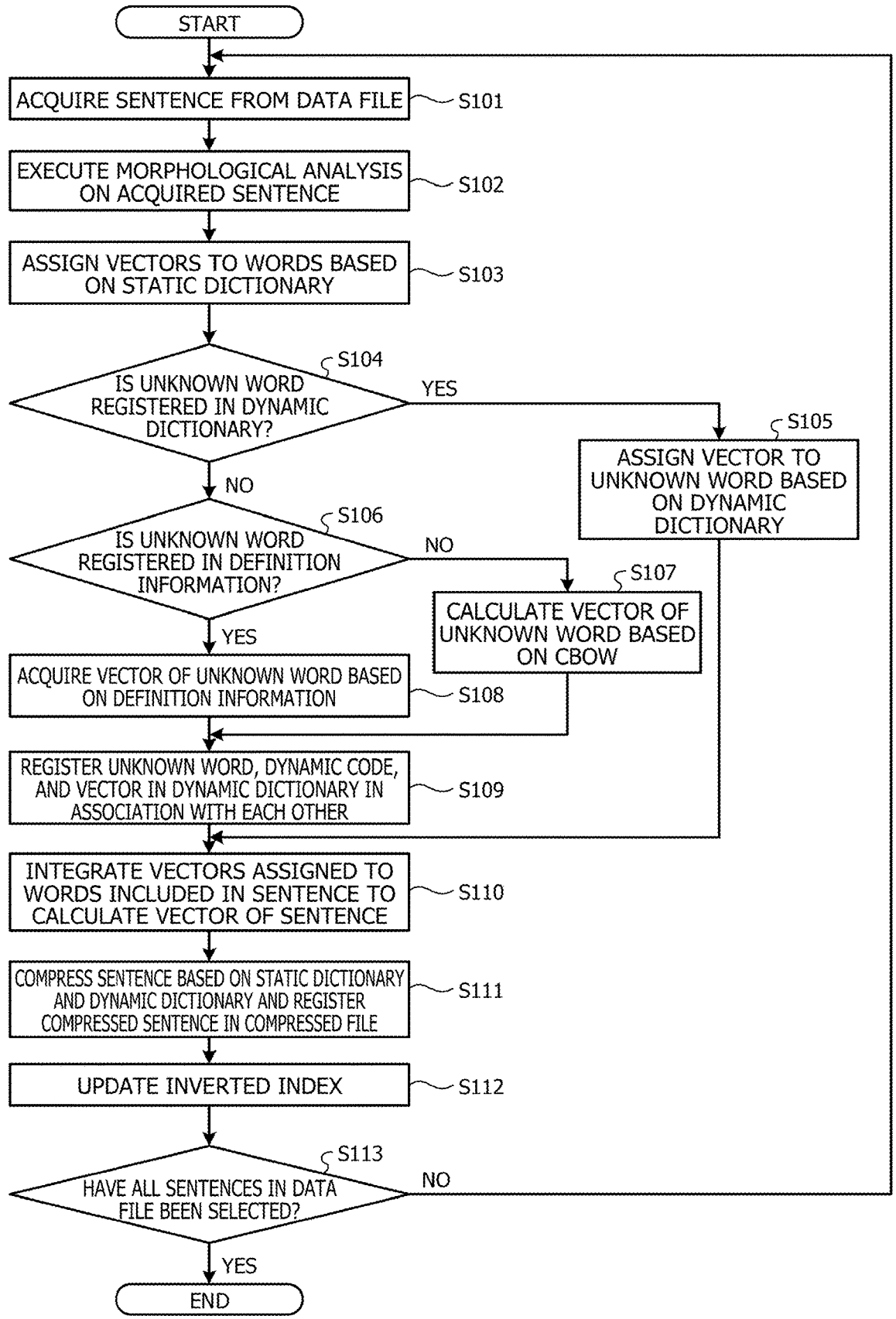
FIG. 8 is a flowchart (1) illustrating a processing procedure of the information processing apparatus according to the present embodiment.

Next, an example of a processing procedure of the information processing apparatus according to the present embodiment will be described. FIG. 8 is a flowchart (1) illustrating a processing procedure of the information processing apparatus according to the present embodiment. As illustrated in FIG. 8, the generation unit 151 of the information processing apparatus 100 acquires a sentence from the file 141a (step S101).

The generation unit 151 executes morphological analysis on the acquired sentence (step S102). The generation unit 151 assigns vectors to words based on the static dictionary 142 (step S103).

The generation unit 151 determines whether or not the unknown word is registered in the dynamic dictionary 144 (step S104). When the unknown word is registered in the dynamic dictionary 144 (Yes at Step S104), the generation unit 151 assigns a vector to the unknown word based on the dynamic dictionary 144 (Step S105), and proceeds to Step S110.

On the other hand, when the unknown word is not registered in the dynamic dictionary 144 (No at Step S104), the generation unit 151 determines whether or not the unknown word is registered in the definition information 143 (Step S106). When the unknown word is not registered in the definition information 143 (No at Step S106), the generation unit 151 calculates a vector of the unknown word based on the CBOW (Step S107), and proceeds to Step S109.

On the other hand, when the unknown word is registered in the definition information 143 (Yes at Step S106), the generation unit 151 acquires a vector of the unknown word based on the definition information 143 (Step S108). The generation unit 151 registers the unknown word, the dynamic code, and the vector in the dynamic dictionary 144 in association with each other (step S109).

The generation unit 151 integrates the vectors assigned to the words included in the sentence to calculate a vector of the sentence (step S110). The generation unit 151 compresses the sentence based on the static dictionary 142 and the dynamic dictionary 144 and registers the compressed sentence in the compressed file 141b (step S111).

The generation unit 151 associates the offset of the compressed sentence with the vector of the sentence and updates the inverted index 145 (step S112). If not all the sentences in data file 141a have been selected (No at step S113), the generation unit 151 proceeds to step S101. On the other hand, when all the sentences in data file 141a have been selected (step S113, Yes), the generation unit 151 ends the processing.

Figure 9:
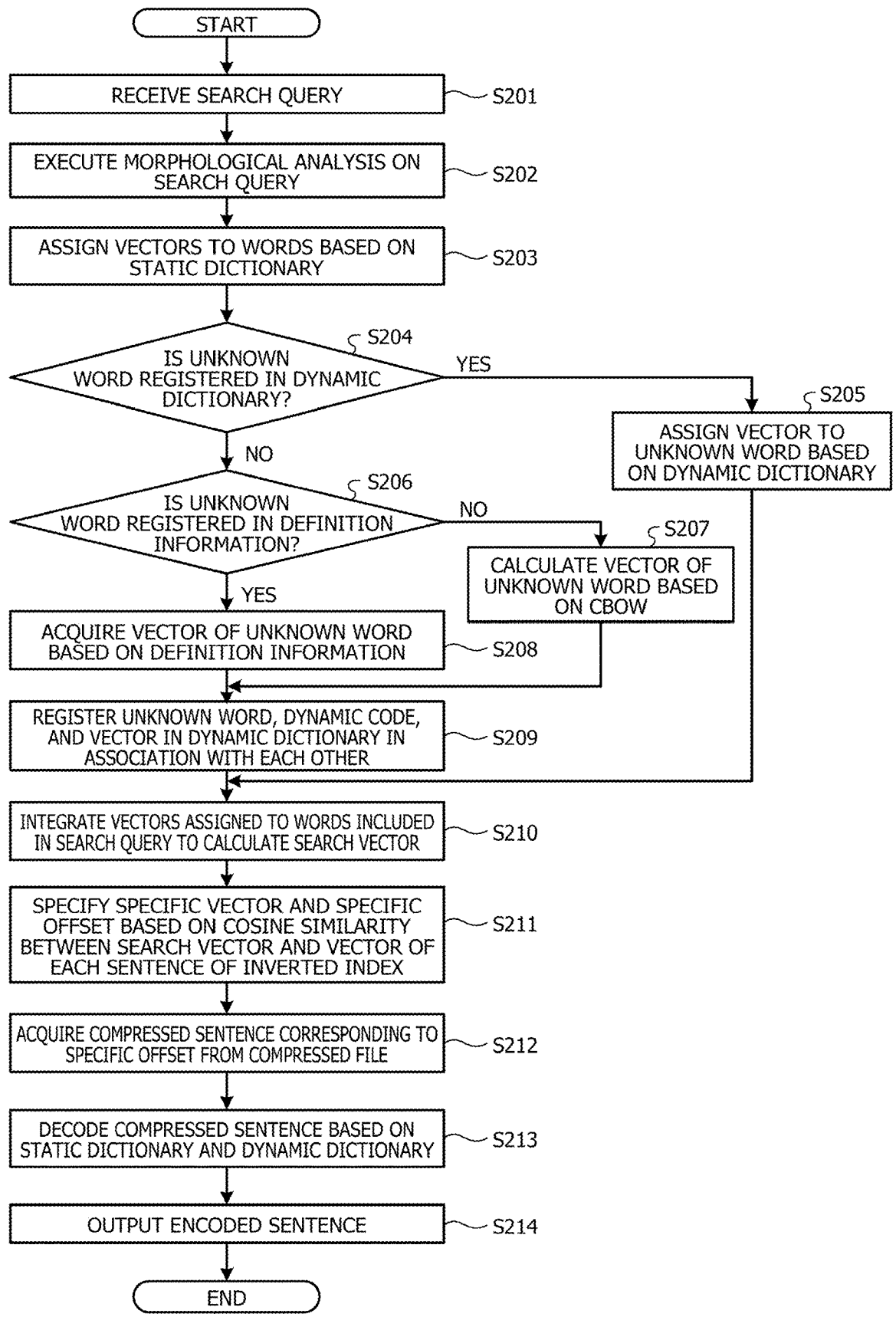
FIG. 9 is a flowchart (2) illustrating the processing procedure of the information processing apparatus according to the present embodiment.

FIG. 9 is a flowchart (2) illustrating the processing procedure of the information processing apparatus according to the present embodiment. As illustrated in FIG. 9, the search unit 152 of the information processing apparatus 100 receives a search query (step S201).

The search unit 152 executes morphological analysis on the search query (step S202). The search unit 152 assigns vectors to words based on the static dictionary 142 (step S203).

The search unit 152 determines whether or not the unknown word is registered in the dynamic dictionary 144 (step S204). When the unknown word is registered in the dynamic dictionary 144 (Yes at Step S204), the search unit 152 assigns a vector to the unknown word based on the dynamic dictionary 144 (Step S205), and proceeds to Step S210.

On the other hand, when the unknown word is not registered in the dynamic dictionary 144 (No at Step S204), the search unit 152 determines whether or not the unknown word is registered in the definition information 143 (Step S206). When the unknown word is not registered in the definition information 143 (No at Step S206), the search unit 152 calculates a vector of the unknown word based on the CBOW (Step S207), and proceeds to Step S209.

On the other hand, when the unknown word is registered in the definition information 143 (Yes at Step S206), the search unit 152 acquires a vector of the unknown word based on the definition information 143 (Step S208). The search unit 152 registers the unknown word, the dynamic code, and the vector in the dynamic dictionary 144 in association with each other (step S209).

The search unit 152 integrates the vectors assigned to the words included in the search query to calculate a search vector (step S210). The search unit 152 specifies a specific vector and a specific offset based on the cosine similarity between the search vector and the vector of each sentence of the inverted index 145 (step S211).

The search unit 152 acquires a compressed sentence corresponding to the specific offset from the compressed file 141b (step S212). The search unit 152 decodes the compressed sentence based on the static dictionary 142 and the dynamic dictionary 144 (step S213). The search unit 152 outputs the decoded sentence (step S214). Next, the advantageous effects of the information processing apparatus 100 according to the present embodiment will be described. When assigning a vector to each word of a sentence, the information processing apparatus 100 assigns a vector defined in the static dictionary 141 to a word registered in the static dictionary 141. The information processing apparatus 100 assigns a vector defined in the definition information 143 to an unknown word included in a sentence when the unknown word corresponds to a proper noun included in the definition information 143, and assigns a vector using CBOW when the unknown word does not correspond to a proper noun included in the definition information 143.

For example, when a vector of an unknown word is calculated using CBOW, the value of the vector may vary depending on words appearing before and after the unknown word. On the other hand, for the proper nouns defined in the definition information 143, it is possible to stabilize the value of the vector by calculating the vector in advance by Poincare embedding. Thus, the accuracy of the sentence vector may be improved.

The information processing apparatus 100 registers a relationship between an unknown word and a vector assigned to the unknown word in the dynamic dictionary 144. Thus, a vector may be assigned to the same unknown word using the dynamic dictionary 144.

The information processing apparatus 100 executes processing for assigning vectors to sentences included in the data file 141a, and compresses the sentences to register the compressed sentences in the compressed file 141b. In addition, the information processing apparatus 100 registers the vector of the compressed sentence and the offset of the sentence in the inverted index 145 in association with each other. By using the inverted index 145, it is possible to easily search for a sentence.

When a search query is received, the information processing apparatus 100 divides the search query into search data and words, and calculates a vector of the search query based on the divided words, the static dictionary 142, the definition information 143, and the dynamic dictionary 144. In addition, the information processing apparatus 100 specifies the position of a sentence similar to the search query on the basis of the vector of the search data and each vector of the inverted index 145. Accordingly, it is possible to accurately search for a sentence similar to the search query.

By the way, in the embodiment described above, the case where the vector is calculated with the granularity of a sentence has been described, but it is also possible to calculate the vector with the granularity of a document. For example, a vector of a document may be calculated by integrating vectors of sentences included in the document. In addition, by further setting a base sequence indicating a genome, a condensed formula of a chemical substance, an error code of a program, or the like as a proper noun of the definition information 143, it is possible to similarly improve the accuracy of a vector of a sentence including a genome, a condensed formula of a chemical substance, and an error code of a program.

Figure 10:
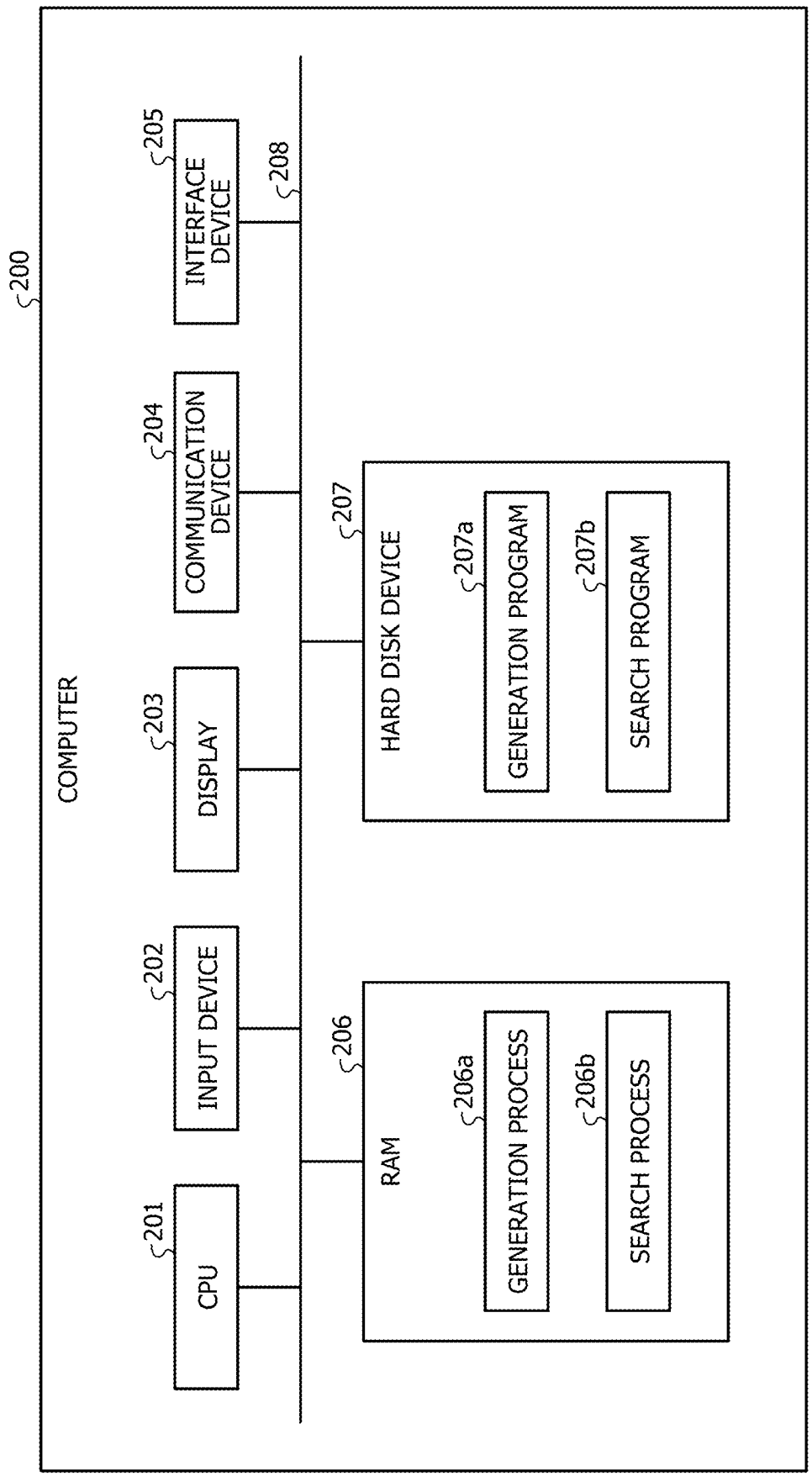
FIG. 10 is a diagram illustrating an example of a hardware configuration of a computer that realizes the same function as the information processing apparatus according to the embodiment.

Next, an example of a hardware configuration of a computer that realizes the same function as the information processing apparatus 100 described in the above-described embodiment will be described. FIG. 10 is a diagram illustrating an example of a hardware configuration of a computer that realizes the same function as the information processing apparatus according to the embodiment.

As illustrated in FIG. 10, a computer 200 includes a CPU201 that executes various types of arithmetic processing, an input device 202 that receives data entry from a user, and a display 203. In addition, the computer 200 includes a communication device 204 that exchanges data with an external device or the like via a wired or wireless network, and an interface device 205. The computer 200 also includes a RAM206 for temporarily storing various types of information and a hard disk device 207. The devices 201 to 207 are coupled to a bus 208.

The hard disk device 207 includes a generation program 207a and a search program 207b. CPU201 reads out the programs 207a and 207b to deploy them in RAM206.

The generation program 207a functions as a generation process 206a. The search program 207b functions as a search process 206b.

The processing of the generation process 206a corresponds to the processing of the generation unit 151. The processing of the search process 206b corresponds to the processing of the search unit 152.

The programs 207a and 207b are not necessarily stored in the hard disk device 207 from the beginning. For example, each program is stored in a "portable physical medium" that is inserted into the computer 200, such as a flexible disk (FD), a CD-ROM, a DVD, a magneto-optical disk, or an IC card. Then, the computer 200 may read and execute the programs 207a and 207b.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing an information processing program for causing a computer to execute processing comprising:
   dividing text data into a plurality of words;
   specifying, among the plurality of words divided from the text data, an unknown word indicating a word that does not correspond to a static word in a static dictionary based on the static dictionary defining a relationship among the static word, a static code, and a first vector;

determining whether a unique word corresponding to the unknown word is included in definition information on the basis of the definition information defining a relationship between the unique word and a second vector being a vector generated on the basis of a condition that similar vectors are set for similar unique words;

in response to the determining that the unique word corresponding to the unknown word is included in the definition information, assigning a dynamic code and the second vector corresponding to the unique word to the unknown word, to register a relationship among the unknown word, the second vector, and the dynamic code in a dynamic dictionary;

in response to the determining that the unique word corresponding to the unknown word is not included in the definition information, assigning the dynamic code and a third vector to the unknown word, to register a relationship among the unknown word, the third vector, and the dynamic code in the dynamic dictionary, the third vector being a vector generated based on words arranged before and after the unknown word;

dividing the text data into a plurality of pieces of partial data, each of the plurality of pieces of partial data being data including two or more words of the plurality of words;

calculating, for each piece of the plurality of pieces of partial data, a partial vector corresponding to the piece of the plurality of pieces of partial data by integrating vectors assigned to the two or more words included in the piece of the plurality of pieces of partial data, each of the vectors assigned to the two or more words being any one of the first vector, the second vector, or the third vector;

compressing, for each piece of the plurality of pieces of partial data, the text data using the static code registered in the static dictionary and the dynamic code registered in the dynamic dictionary, to generate compressed text data;

generating, for each piece of the plurality of pieces of partial data, an inverted index associating the partial vector and a position of the piece of the plurality of pieces of partial data in the compressed text data.

2. The non-transitory computer-readable storage medium according to claim 1, the processing further comprising:

when search data is received, dividing the search data into words to assign vectors to the respective divided words based on the divided words, the static dictionary, the definition information, and the dynamic dictionary;

calculating a vector of the search data by integrating the vectors assigned to the respective divided words of the search data;

specifying, among the plurality of pieces of partial data, a position of a piece of the plurality of partial data similar to the search data based on the vector of the search data and the inverted index generated for each of the plurality of pieces of partial data;

decoding a part of the compressed text data corresponding to the specified the position using said static dictionary and said dynamic dictionary, to generate a plain text decoded from the part of the compressed text; and outputting, as a response for the received search data, a response including the generated plain text.

3. An information processing method implemented by a computer, the information processing method comprising:

dividing text data into a plurality of words;

specifying, among the plurality of words divided from the text data, an unknown word indicating a word that does not correspond to a static word in a static dictionary based on the static dictionary defining a relationship among the static word, a static code, and a first vector;

determining whether a unique word corresponding to the unknown word is included in definition information on the basis of the definition information defining a relationship between the unique word and a second vector being a vector generated on the basis of a condition that similar vectors are set for similar unique words;

in response to the determining that the unique word corresponding to the unknown word is included in the definition information, assigning a dynamic code and the second vector corresponding to the unique word to the unknown word, to register a relationship among the unknown word, the second vector, and the dynamic code in a dynamic dictionary;

in response to the determining that the unique word corresponding to the unknown word is not included in the definition information, assigning the dynamic code and a third vector to the unknown word, to register a relationship among the unknown word, the third vector, and the dynamic code in the dynamic dictionary, the third vector being a vector generated based on words arranged before and after the unknown word;

dividing the text data into a plurality of pieces of partial data, each of the plurality of pieces of partial data being data including two or more words of the plurality of words;

calculating, for each piece of the plurality of pieces of partial data, a partial vector corresponding to the piece of the plurality of pieces of partial data by integrating vectors assigned to the two or more words included in the piece of the plurality of pieces of partial data, each of the vectors assigned to the two or more words being any one of the first vector, the second vector, or the third vector;

compressing, for each piece of the plurality of pieces of partial data, the text data using the static code registered in the static dictionary and the dynamic code registered in the dynamic dictionary, to generate compressed text data;

generating, for each piece of the plurality of pieces of partial data, an inverted index associating the partial vector and a position of the piece of the plurality of pieces of partial data in the compressed text data.

4. The information processing method according to claim 3, the method further comprising:

when search data is received, dividing the search data into words to assign vectors to the respective divided words based on the divided words, the static dictionary, the definition information, and the dynamic dictionary;

calculating a vector of the search data by integrating the vectors assigned to the respective divided words of the search data;

specifying, among the plurality of pieces of partial data, a position of a piece of the plurality of partial data similar to the search data based on the vector of the search data and the inverted index generated for each of the plurality of pieces of partial data;

decoding a part of the compressed text data corresponding to the specified the position using said static dictionary and said dynamic dictionary, to generate a plain text decoded from the part of the compressed text; and outputting, as a response for the received search data, a response including the generated plain text.

5. An information processing apparatus comprising:
a memory; and
a hardware processor circuit coupled to the memory, the hardware processor circuit being configured to execute processing including:
dividing text data into a plurality of words;
specifying, among the plurality of words divided from the text data, an unknown word indicating a word that does not correspond to a static word in a static dictionary based on the static dictionary defining a relationship among the static word, a static code, and a first vector;
determining whether a unique word corresponding to the unknown word is included in definition information on the basis of the definition information defining a relationship between the unique word and a second vector being a vector generated on the basis of a condition that similar vectors are set for similar unique words;
in response to the determining that the unique word corresponding to the unknown word is included in the definition information, assigning a dynamic code and the second vector corresponding to the unique word to the unknown word, to register a relationship among the unknown word, the second vector, and the dynamic code in a dynamic dictionary;
in response to the determining that the unique word corresponding to the unknown word is not included in the definition information, assigning the dynamic code and a third vector to the unknown word, to register a relationship among the unknown word, the third vector, and the dynamic code in the dynamic dictionary, the third vector being a vector generated based on words arranged before and after the unknown word;
dividing the text data into a plurality of pieces of partial data, each of the plurality of pieces of partial data being data including two or more words of the plurality of words;
calculating, for each piece of the plurality of pieces of partial data, a partial vector corresponding to the piece of the plurality of pieces of partial data by integrating vectors assigned to the two or more words included in the piece of the plurality of pieces of partial data, each of the vectors assigned to the two or more words being any one of the first vector, the second vector, or the third vector;

compressing, for each piece of the plurality of pieces of partial data, the text data using the static code registered in the static dictionary and the dynamic code registered in the dynamic dictionary, to generate compressed text data;

generating, for each piece of the plurality of pieces of partial data, an inverted index associating the partial vector and a position of the piece of the plurality of pieces of partial data in the compressed text data.

6. The information processing apparatus according to claim 5, the processing performed by the hardware processor circuit further comprising:

when search data is received, dividing the search data into words to assign vectors to the respective divided words based on the divided words, the static dictionary, the definition information, and the dynamic dictionary;

calculating a vector of the search data by integrating the vectors assigned to the respective divided words of the search data;

specifying, among the plurality of pieces of partial data, a position of a piece of the plurality of partial data similar to the search data based on the vector of the search data and the inverted index generated for each of the plurality of pieces of partial data;

decoding a part of the compressed text data corresponding to the specified the position using said static dictionary and said dynamic dictionary, to generate a plain text decoded from the part of the compressed text; and outputting, as a response for the received search data, a response including the generated plain text.

* * * * *